(12) United States Patent
Townsend et al.

(10) Patent No.: US 6,782,160 B2
(45) Date of Patent: Aug. 24, 2004

(54) OPTICAL-SIGNAL COUPLER AND RELATED METHOD

(75) Inventors: VanWinkle T. Townsend, Herndon, VA (US); Robert J. Varley, Haymarket, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 28 days.

(21) Appl. No.: 10/120,984

(22) Filed: Apr. 10, 2002

(65) Prior Publication Data

US 2003/0194176 A1 Oct. 16, 2003

(51) Int. Cl.$^7$ .............................. G02B 6/26; G02B 6/42
(52) U.S. Cl. ............................. 385/25; 385/15; 385/26; 385/31; 385/36; 385/39; 385/73; 359/211; 359/212; 359/223; 359/226; 359/831; 359/833; 359/837
(58) Field of Search .............................. 385/15, 25, 26, 385/31, 36, 39, 52, 73, 92; 359/211, 212, 223, 226, 831, 833, 837

(56) References Cited

U.S. PATENT DOCUMENTS

| | | | | |
|---|---|---|---|---|
| 4,061,135 A | * | 12/1977 | Widran et al. | 600/111 |
| 4,509,827 A | | 4/1985 | Cowen et al. | 350/320 |
| 4,643,521 A | | 2/1987 | Harstead et al. | 350/96.2 |
| 4,725,116 A | | 2/1988 | Spencer et al. | 350/96.2 |
| H551 H | | 12/1988 | Chaoui et al. | 350/96.2 |
| 4,872,737 A | | 10/1989 | Fukahori et al. | 350/96.2 |
| 5,015,064 A | * | 5/1991 | Detig et al. | 359/211 |
| 5,073,040 A | | 12/1991 | Guinard | 385/26 |
| 5,157,745 A | * | 10/1992 | Ames | 385/26 |
| 5,191,203 A | | 3/1993 | McKinley | 250/208.1 |
| 5,271,076 A | * | 12/1993 | Ames | 385/26 |
| 5,371,814 A | * | 12/1994 | Ames et al. | 385/25 |
| 5,512,741 A | * | 4/1996 | Levaillant et al. | 250/203.3 |
| 5,568,578 A | * | 10/1996 | Ames | 385/34 |
| 5,640,325 A | | 6/1997 | Banbrook et al. | 364/453 |
| 6,034,924 A | | 3/2000 | Vakoc | 367/149 |
| 6,097,486 A | | 8/2000 | Vakoc et al. | 356/345 |
| 6,215,919 B1 | * | 4/2001 | Li et al. | 385/16 |
| 6,522,800 B2 | * | 2/2003 | Lucero | 385/16 |
| 6,704,477 B2 | * | 3/2004 | Zhou | 385/22 |

FOREIGN PATENT DOCUMENTS

| | | | | |
|---|---|---|---|---|
| EP | 0 111 390 A | | 6/1984 | G02B/7/26 |
| JP | 58072108 A | * | 4/1983 | G02B/5/14 |
| JP | 62099717 A | * | 5/1987 | G02B/26/08 |
| JP | 63201608 A | * | 8/1988 | G02B/6/42 |
| WO | WO 01/98801 A | | 12/2001 | G02B/6/00 |

OTHER PUBLICATIONS

International Search Report for PCT/US 03/11181, dated Jul. 9, 2003.

* cited by examiner

Primary Examiner—Brian Healy
Assistant Examiner—Daniel Petkovsek
(74) Attorney, Agent, or Firm—Grayheal Jackson Haley LLP (57) ABSTRACT

An optical coupler includes a housing, and includes first and second optical terminals and a prism disposed in the housing. One terminal is moveable with respect to the other, and the prism maintains an optical alignment between the terminals. Because it includes a prism instead of a more complex and delicate optical assembly, such an optical coupler can often be less expensive and more rugged, and can often have a higher connection density, than prior optical couplers.

25 Claims, 9 Drawing Sheets

OPTICAL-SIGNAL COUPLER AND RELATED METHOD

BACKGROUND OF THE INVENTION

A communication cable—sometimes called an "umbilical cord"—allows for the reliable communication of data and the transfer of power between a base station and a remote apparatus. For example, such a cable allows for the transfer of data between a surface vessel and a manned submersible, and another such cable allows for the transfer of data between the submersible and a remote-controlled exploration robot. These same cables also respectively allow the surface vessel to provide electric power to the submersible, and the submersible to provide power to the robot.

Because a communication cable is often prone to twisting and tangling—a cable that connects a surface vessel to a manned submersible can be more than a mile long—the cable is often formed from cable segments that are connected with rotary couplers. Each coupler serially connects two cable segments, and helps prevent twisting and tangling by allowing one segment to rotate freely with respect to the other segment. Moreover, for many of these applications it is required to deploy and retrieve the cable via a rotating stowage drum fixed to either the base or remote vessel.

And because a cable segment is typically formed from one or more bundles of filaments that each carry a different signal, a rotary coupler is designed to connect each filament from one cable segment to the same filament in the other segment. The filaments are typically electrically conductive wires, optical fibers, or a combination of both wires and fibers.

An electrical rotary coupler—one that interconnects cable segments that include only conductive wires—is typically rugged enough for use in harsh environments such as water, is relatively inexpensive, and has a relatively high connection density (the number of wire connections per unit of cross-sectional area). Because an electrical signal can propagate between conductors that merely touch one another, an electrical rotary coupler typically includes a metal slip-ring assembly that maintains the respective electrical connections between the wires of the cable segments as one segment rotates with respect to the other segment. Because the slip-ring assembly is made out of metal, the electrical coupler is relatively rugged. That is, the coupler can withstand the jarring, pressure, and other effects that are often characteristic of harsh environments. Furthermore, because it has a simple design, the electrical coupler is relatively easy to manufacture, and is thus relatively inexpensive. And because adding slip rings—typically one ring per cable wire—to the assembly increases the length, but not the width, of the coupler, the coupler's connection density can be relatively high.

But unfortunately, an optical rotary coupler—one that interconnects cable segments that include at least some optical fibers—is typically more sensitive and expensive, and has a lower connection density, than an electrical rotary coupler. Optical signals cannot propagate between optical fibers merely because they touch. Therefore, an optical coupler typically includes a delicate and complex optical assembly that maintains the fibers in one cable segment in optical alignment with the corresponding fibers in the other cable segment as one cable segment rotates with respect to the other. Unfortunately, because the optical assembly is delicate, jarring, pressure, and other environmental effects may adversely affect it such that the fibers become misaligned. If this misalignment becomes to large, one must remove the coupler and recalibrate it, repair it, or replace it. Furthermore, because the optical assembly is complex, it is often difficult to manufacture, and thus is often expensive. In addition, because the complexity, and thus the cost, of the optical assembly often increase as the number of fibers increases, the coupler's connection density and connection capacity—the total number of filaments that the optical coupler can interconnect—are often relatively low.

GENERAL OVERVIEW OF A DOVE PRISM

Figure 1:
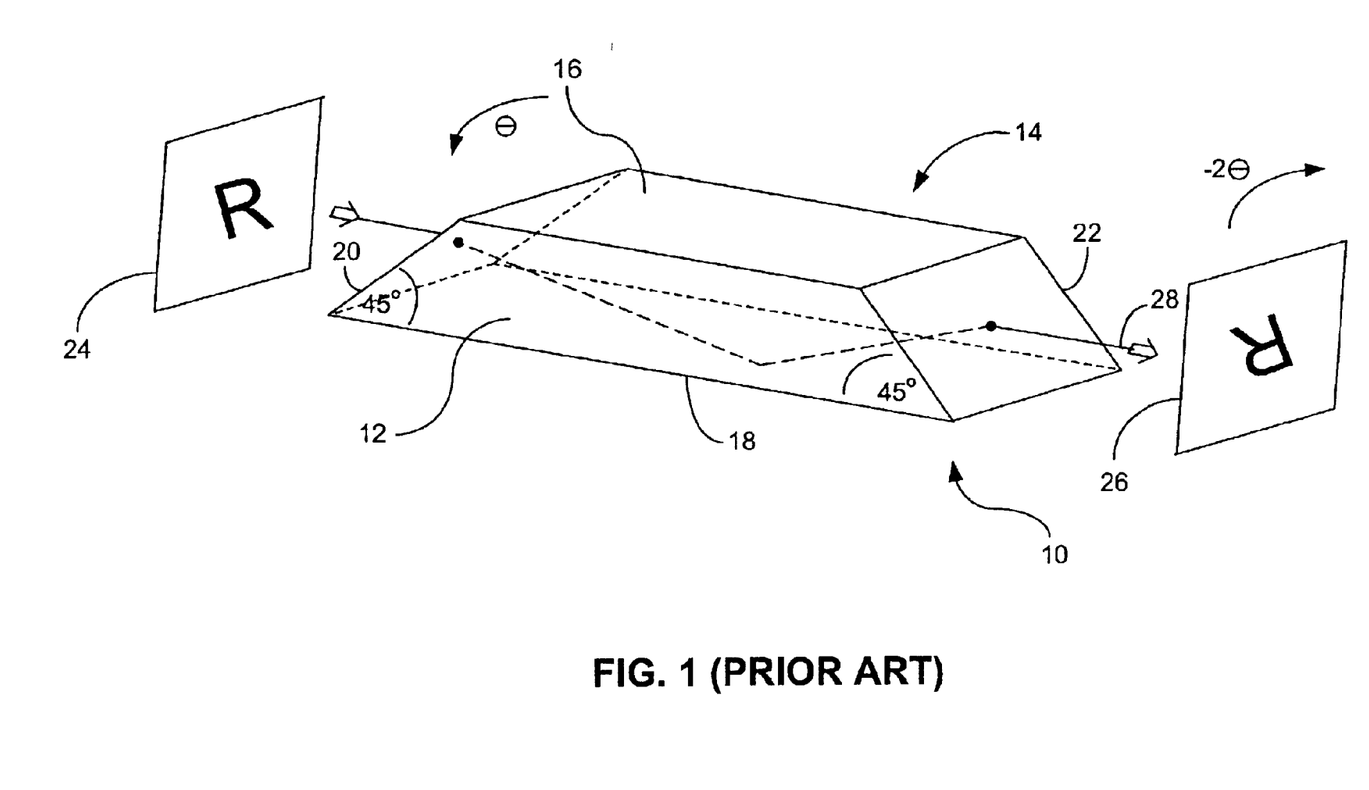
FIG. 1 is a conventional dove prism, an image incident to the prism, and an image projected by the prism.

Referring to FIG. 1, a conventional dove prism 10 is typically derived from a lower portion of a conventional right-angle prism (not shown), and has sides 12 and 14, a ceiling 16, a base 18 which may or may not have a reflective coating, and ends 20 and 22 that are at equal angles, typically 45°, to the base 18. When an image 24 is incident to the end 20 as shown, the prism 10 projects an inverted mirror image 26 from the end 22. It is well known that as the prism 10 rotates through an angle θ about a center axis 28, the projected image 26 rotates through an angle −2θ about the axis, or twice as far as the prism in the opposite direction. For example, if the prism 10 rotates 90° in a counterclockwise direction, then the projected image 26 rotates 180° in a clockwise direction. And if the prism 10 rotates 180° such that the base 18 is at the top of the prism, the projected image 26 rotates a full 360°. Thus, for every full revolution of the prism 10, the projected image 26 rotates two full revolutions. Furthermore, it is well known that as the incident image 24 rotates through an angle θ about the axis 28, the projected image 26 rotates through an angle −θ, or as far as the image 24 in the opposite direction.

Referring to FIGS. 2–5, the properties of the prism 10 of FIG. 1 are explained with reference to a reference plane 40 and a collimated light beam 42, which is incident to the end 20 of the prism, is projected from the end 22, and is parallel to the ceiling 16 and base 18 before it enters and after it exits the prism. The prism has a perpendicular height H between the ceiling 16 and base 18, and a length L along the length of the base 18. The prism 10 also has an index of refraction that allows the prism to have the characteristics described below.

Figure 2:
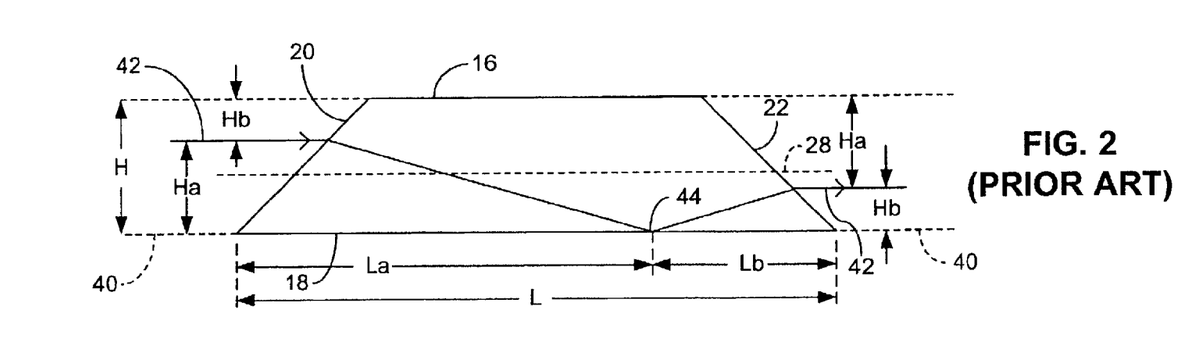
FIG. 2 is a side view of the dove prism of FIG. 1 in its 0° position and of a collimated light beam that propagates through the prism.
Figure 3:
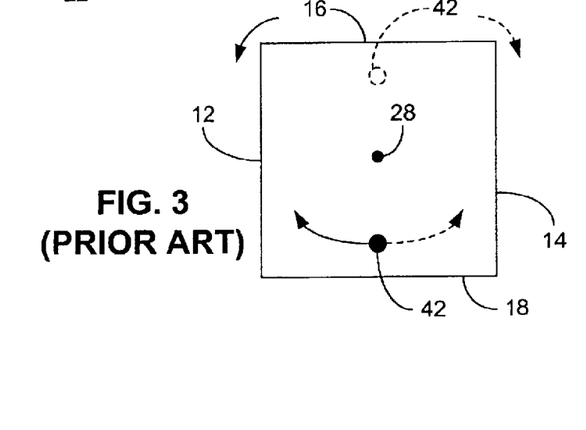
FIG. 3 is an end view of the dove prism and the light beam of FIG. 2 and illustrates the known relationship between the rotation of the prism and the rotation of the projected portion of the light beam.
Figure 4:
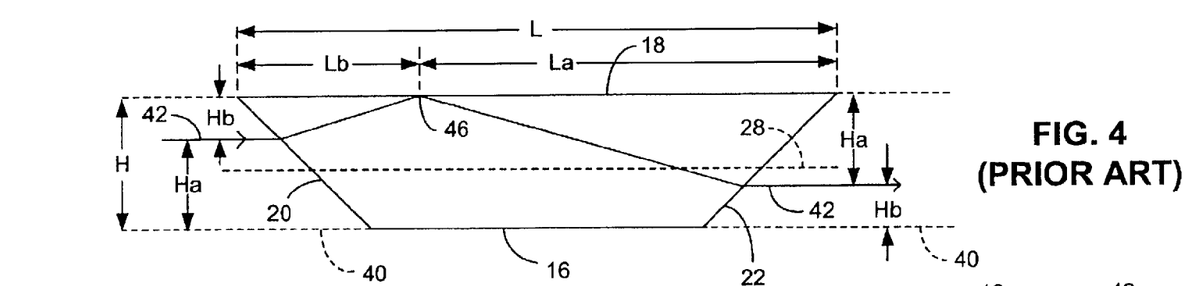
FIG. 4 is a side view of the dove prism of FIG. 1 in its 180° position and of the collimated light beam of FIG. 2.

FIGS. 2–4 illustrate how a 180° revolution of the prism 10 about the axis 28 in one direction results in a 360° revolution of the projected portion of the beam 42 about the same axis in the other direction.

FIG. 2 is a side view of the prism 10 in its 0° position (the base 18 is coincident with the reference plane 40) and the light beam 42. The incident portion of the light beam 42 is a height Ha from the base 18, and the end 20 refracts the beam to a reflection point 44, which is a distance La from the end 20 and a distance Lb from the end 22. The end 22 refracts the reflected portion of the beam 42 such that the projected portion of the beam is a height Hb from the base 18.

FIG. 3 is a view of the prism 10 from the end 22, where the prism is in its 0° position, the broken-line circle represents the incident portion of the beam 42, and the solid circle represents the projected portion of the beam. Assuming that the incident portion of the beam 42 is stationary, as the prism 10 rotates about the axis 28 in a clockwise direction, the projected portion of the beam rotates at about the axis in a counterclockwise direction at twice the rotational rate of the prism. The directions of these respective rotations are represented by the broken-line arrows. Conversely, as the prism 10 rotates about the axis 28 in a counterclockwise direction, the projected portion of the beam rotates about the axis in a clockwise direction at twice the rotational rate of the prism. The directions of these respective rotations are represented by the solid-line arrows.

FIG. 4 is a side view of the prism 10 in its 180° position (the ceiling 16 is coincident with the reference plane 40) and parallel to the light beam 42. Because the projected portion of the beam 42 is in the same position with respect to the reference plane 40 as it was when the prism 10 was in its 0° position, it is evident that the projected portion has undergone a full revolution about the axis 28 in response to the half revolution of the prism 10. Specifically, because the incident portion of the beam 42 has remained the height Ha above the reference plane 40, it is now a drop of Hb below the base 18. Consequently, using well-known geometrical principles, the end 20 refracts the beam 42 to a reflection point 46, which is the distance Lb from the end 20 and the distance La from the end 22. The end 22 refracts the reflected portion of the beam 42 such that the beam's projected portion is a drop Ha below the base 18 and the height Hb above the reference plane 40.

Figure 5:
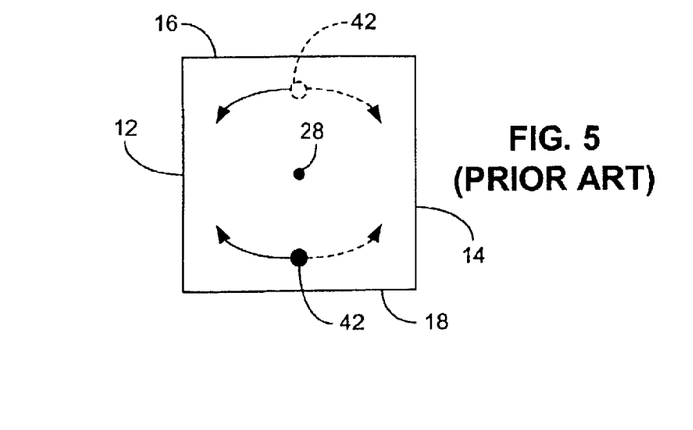
FIG. 5 is an end view of the dove prism and the light beam of FIG. 2 and illustrates the known relationship between the rotations of the incident and the projected portions of the light beam.

FIG. 5 illustrates how rotation of the incident portion of the beam 42 about the axis 28 in one direction results in an equal rotation of the projected portion of the beam 42 about the axis in the other direction. FIG. 5 is a view of the prism 10 from the end 22, where the prism is in its 0° position, the broken-line circle represents the incident portion of the beam 42, and the solid circle represents the projected portion of the beam. Assuming that the prism 10 is stationary, as the incident portion of the beam 42 rotates about the axis 28 in a clockwise direction, the projected portion of the beam rotates about the axis in a counterclockwise direction at the same rotational rate as the incident portion of the beam. These respective rotations are represented by the broken-line arrows. Conversely, as the incident portion of the beam 42 rotates about the axis 28 in a counterclockwise direction, the projected portion of the beam rotates about the axis in a clockwise direction at the same rotational rate as the incident portion of the beam. These respective rotations are represented by the solid-line arrows.

SUMMARY OF THE INVENTION

One embodiment of the invention is an optical coupler that includes a housing and includes first and second optical terminals and a prism disposed in the housing. One terminal is moveable with respect to the other, and the prism maintains an optical alignment between the terminals.

Because it includes a prism instead of a more complex and delicate optical assembly, such an optical coupler can often be less expensive and more rugged, and can often have a higher connection density, than prior optical couplers.

DESCRIPTION OF THE PREFERRED EMBODIMENTS

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention as defined by the appended claims. Thus, the present invention is not intended to be limited to the embodiments shown, but is to be accorded the widest scope consistent with the principles and features disclosed herein.

Figure 6:
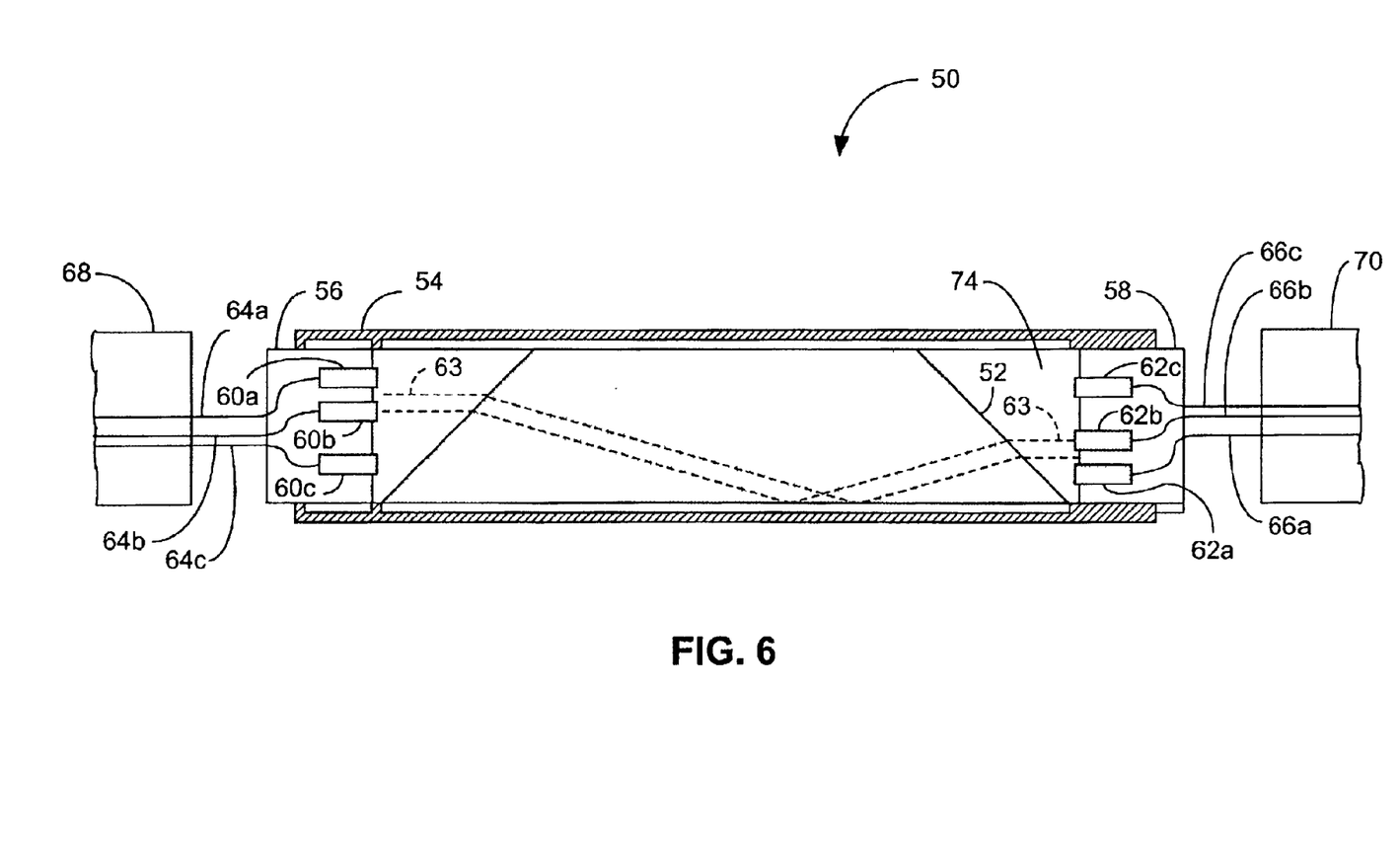
FIG. 6 is a cross-sectional view of a mechanical optical rotary coupler according to an embodiment of the invention.

FIG. 6 is a cross-sectional view of a mechanical optical rotary coupler 50 according to an embodiment of the invention. The coupler 50 includes a prism 52 instead of the more complex and delicate optical assemblies often found in conventional optical rotary couplers. Consequently, the coupler 50 is often less expensive and more rugged, and can have a higher connection density, than conventional optical rotary couplers.

The optical rotary coupler 50 includes a cylindrical housing 54, a connector 56 attached to one end of the housing and rotatable independently of the housing, and a connector 58 attached to the other end of the housing and not rotatable independently of the housing. That is, the connector 58 and housing 54 rotate together. Each of the connectors 56 and 58 includes one or more optical terminals 60 and 62, respectively. For clarity, six terminals 60a–60c and 62a–62c, are shown, it being understood that the connectors 56 and 58 can each have more or fewer than three terminals. Each of the terminals 60 is optically aligned with a corresponding terminal 62, and, as discussed below, the coupler 50 maintains this alignment as the connector 56 rotates. For example, the terminal 60b is optically aligned with the terminal 62b such that a light beam 63 can propagate from the terminal 60b to the terminal 62b or vice versa. Likewise, the terminals 60a and 60c are optically aligned with the terminals 62a and 62c, respectively. The terminals 60a–60c and 62a–62c respectively connect to corresponding optical fibers 64a–64c and 66a–66c of the cable segments 68 and 70 to which the connectors 56 and 58 are attached—the fibers 64 and 66 and the segments 68 and 70 are not part of the coupler 50, but are included in FIG. 6 for clarity. Furthermore, the terminals 60 and 62 may be conventional beam collimators such as GRIN (graded index of refraction) lenses. Or instead of including separate collimators, each connector 56 and 58 may include a respective single collimation lens (not shown) to which all of the fibers 64 and 66 are connected. That is, the single lens of the connector 56 would act as a terminal for all of the fibers 64; likewise, the single lens of the connector 58 would act as a terminal for all of the fibers 66. Alternatively, the terminals 60 and 62 may be non-optical terminals that merely secure the ends of the fibers 64 and 66. Although including such non-optical terminals may reduce the cost and complexity of the coupler 50, it often reduces the coupler's connection density because the uncollimated light beams may spread, and thus have larger diameters, after they leave their respective fibers.

Still referring to FIG. 6, the coupler 50 also includes the prism 52, here a conventional dove prism such as the prism 10 of FIG. 1, that maintains the optical alignment between the terminals 60 and 62 as the connector 56 rotates with respect to the connector 58. The prism 52 is mounted within the housing 54 between the connectors 56 and 58, and is rotatable with respect to the housing 54. Specifically, as the connector 56 rotates due to the twisting or untwisting of one or both of the cable segments 68 and 70, the prism 52 also rotates to maintain optical alignment between the each of the terminals 60 and a respective terminal 62. That is, as discussed in more detail below, the prism 52 rotates to counteract the affect that the rotation of the connector 56 has on the optical alignment between the terminals 60 and 62. The coupler 50 can include a gear assembly (not shown) or can include other conventional means (not shown) to rotate the prism 52. In one embodiment, the prism 52 is similar to the prism 10 of FIG. 1. Alternatively, the sides, ceiling, and base of the prism 52 may be round to fit more snugly within the cylindrical housing 54 as discussed below in conjunction with FIG. 8.

Figure 7:
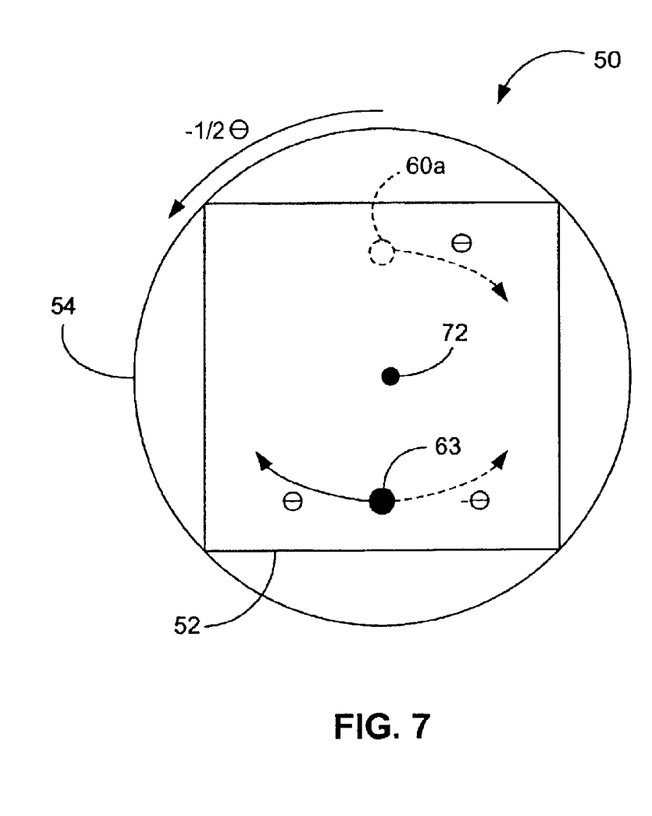
FIG. 7 is a end view of the optical rotary coupler of FIG. 6 and illustrates how the coupler maintains optical alignment between corresponding optical terminals.

Referring to FIGS. 4–7, the operation of the coupler 50 is discussed according to an embodiment of the invention where the beam 63 propagates from the terminal 60b to the terminal 62b, it being understood that operation is similar for the beam 63 propagating in the opposite direction and for the other terminals and beams (other beams not shown). Referring to FIG. 7, for the reasons discussed above in conjunction with FIG. 5, as the connector 56 rotates through an angle θ about a center axis 72 of the housing 54, the projected portion of the beam 63 rotates through an angle −θ. Therefore, the coupler 50 rotates the prism 52 to impart a counter rotation of θ to the projected portion of the beam 63. That is, because −θ+θ=0, the projected portion of the beam 63 will remain stationary with respect to the connector 58, and thus will remain aligned with the terminal 62b. More specifically, as discussed above in conjunction with FIG. 4, as the prism 52 rotates through an angle θ about the housing's center axis 72, the projected portion of the beam 63 rotates through an angle of −2θ. But, referring to FIG. 7, because the coupler 50 needs to impart a counter rotation of θ to the projected portion of the beam 63 to keep it aligned with the terminal 62b, it rotates the prism 52 through an angle of −½θ to counteract the rotation of the terminal 60b. That is, to maintain optical alignment between the respective terminals 60a–60c and 62a–62c for each angle θ through which the connector 56 rotates with respect to the housing 54 and connector 58, the coupler 50 causes the prism 52 to rotate through an angle of −½θ with respect to the housing and connector 58. For example, if the connector 56 rotates 90° in a clockwise direction with respect to the housing 54 and connector 58, then the coupler 50 rotates the prism 45° in a counterclockwise direction with respect to the housing and connector 58.

Referring again to FIG. 6, one can make the coupler 50 suitable for use in harsh environments and high-precision applications. To make the coupler 50 suitable for high pressures, one can fill an interior 74 of the housing 54 with a transparent liquid and use O-rings (not shown) to form a fluid-tight seal between the connectors 56 and 58 and the housing. For example, one can form the prism 52 out of zinc selenide or chalcogenide glass and use mineral oil for the transparent liquid. And to increase the precision at which the coupler 50 rotates the prism 52 to maintain optical alignment, one can construct the rotation assembly (not shown) using ceramic-sleeve technology.

Furthermore, other embodiments of the coupler 50 are contemplated. For example, the housing 54 may be non-cylindrical. In addition, the connector 58 may be rotatable independently of the housing 54. Moreover, another type of prism, or prism assembly, may be used.

Figure 8:
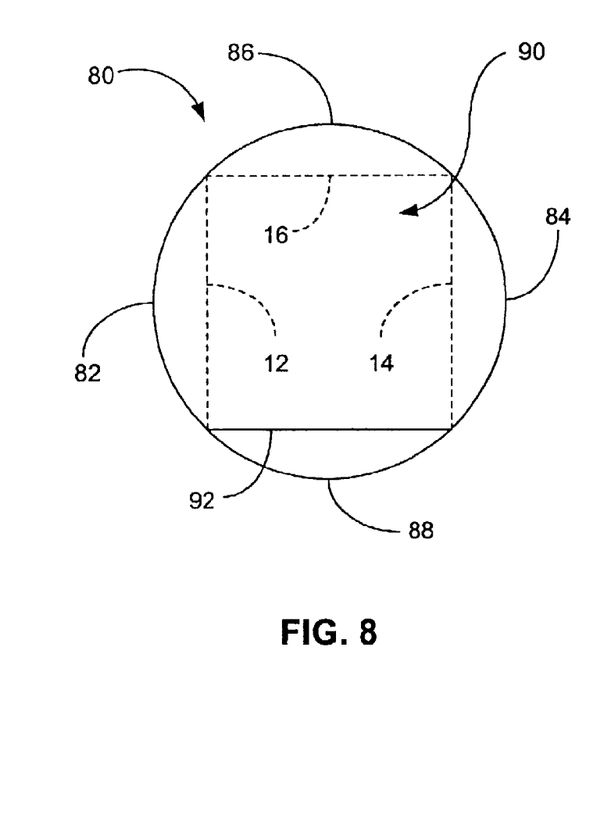
FIG. 8 is an end view of the prism of FIG. 6 according to an embodiment of the invention.

FIG. 8 is an end view of a cylindrical dove prism 80 that can replace the prism 52 of FIG. 6 according to an embodiment of the invention. The prism 80 is similar to the prism 10 of FIG. 1 except that the sides 82 and 84, the ceiling 86, and the base 88 are rounded so that the prism is cylindrically shaped to fit snugly within the cylindrical housing 54. For comparison purposes, the outline of the prism 52 is shown in broken line. So that the prism 80 retains the optical properties of the dove prism 52, the ends (only end 90 shown) remain flat and angled 45° from a planar reflector 92 that is imbedded in the prism 80.

Figure 9:
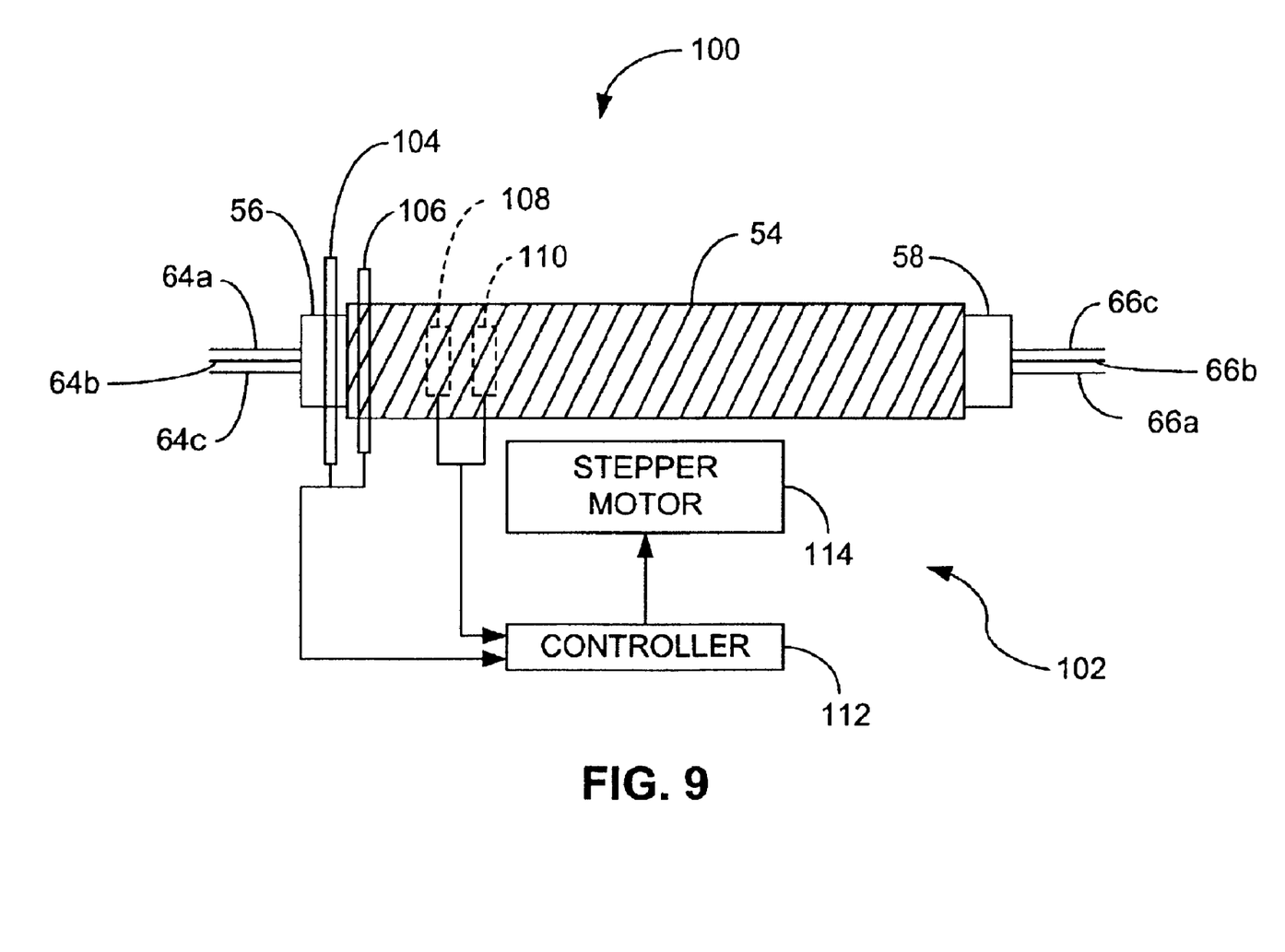
FIG. 9 is schematic block diagram of an electronic optical rotary coupler according to an embodiment of the invention.

FIG. 9 is a schematic block diagram of an electronic optical rotary coupler 100 according to an embodiment of the invention, where like numbers reference common components with respect to the coupler 50 of FIG. 6. The coupler 100 is similar to the coupler 50 except that an alignment circuit 102 electronically monitors the rotation of the connector 56 and controls the rotation of the prism 52 (FIG. 6). Consequently, the circuit 102 may provide a more precise optical alignment between the terminals 60 and 62 (FIG. 6) than the mechanical alignment assembly (not shown) of the coupler 50.

The alignment circuit 102 includes optical sensors 104, 106, 108, and 110, a controller circuit 112, and a stepper motor 114. The sensor 104 is mounted around the outside of the connector 56, and rotates as the connector 56 rotates. Likewise, the sensor 106 is mounted to the outside of the housing 54, and rotates as the housing 54 and connector 58 rotate—as discussed above in conjunction with FIG. 6, the housing and the connector 58 are connected such that they rotate together. The sensors 104 and 106 sense a home position of the connector 56 and the angle through which the connector 56 rotates with respect to the connector 58, and provide this data to the circuit 112. From this angle data, the circuit 112 calculates the angle of prism rotation needed to maintain optical alignment between the terminals 60 and 62 (FIG. 6), and controls the motor 114 to rotate the prism 52 through this calculated angle. The sensor 108 is mounted around the prism 52, and rotates as the prism rotates. Likewise, the sensor 110 is mounted to the inside of the housing 54, and rotates as the housing and connector 58 rotate. The sensors 108 and 110 sense a home position of the prism 52 and the angle through which the prism 52 rotates with respect to the connector 58, and provide this data to the circuit 112. As discussed below, the circuit may use this angle data, or count the number of steps it rotates the motor 114, to determine when the prism 52 has rotated through the calculated alignment-maintenance angle.

In operation according to an embodiment of the invention, the controller circuit 112 causes the stepper motor 114 to rotate until the sensors 108 and 110 indicate that the prism 52 (FIG. 6) is in its home position with respect to the connector 58. Next, the circuit 112 processes the angle data from the sensors 104 and 106 and determines the angular distance θ of the connector 56 from its home position. Then, if the connector 56 is not in its home position (i.e., θ≠0, the circuit 112 calculates the angle −½θ that it must rotate the prism 52 to bring the terminals 60 and 62 (FIG. 6) back into optical alignment, and causes the motor 114 to rotate the prism through this calculated angle. The circuit 112 monitors the sensors 108 and 110, determines when the prism 52 has rotated through the calculated angle −½θ, and then stops the motor 114. Or, the circuit 112 calculates the number of motor steps needed to rotate the prism 52 through −½θ, counts the number of steps that it rotates the motor 114, and then stops the motor when the count equals the calculated number of steps. Alternatively, the circuit 112 both monitors the sensors 108 and 110 and counts the number of motor steps. The circuit 112 continues to monitor the sensors 104 and 106 and causes the motor 112 to rotate the prism 52 as needed to maintain optical alignment between the terminals 60 and 62 in response to any further rotation of the connector 56.

Still referring to FIG. 9, other embodiments of the electronic optical rotary coupler 100 are contemplated. For example, one or more of the sensors 104, 106, 108, and 110 may be non-optical sensors. Also, where the controller circuit 112 monitors the sensors 108 and 110 to determine the angle −½θ through which it rotates the prism 52, the motor 114 may be a non-stepper motor.

Figure 10:
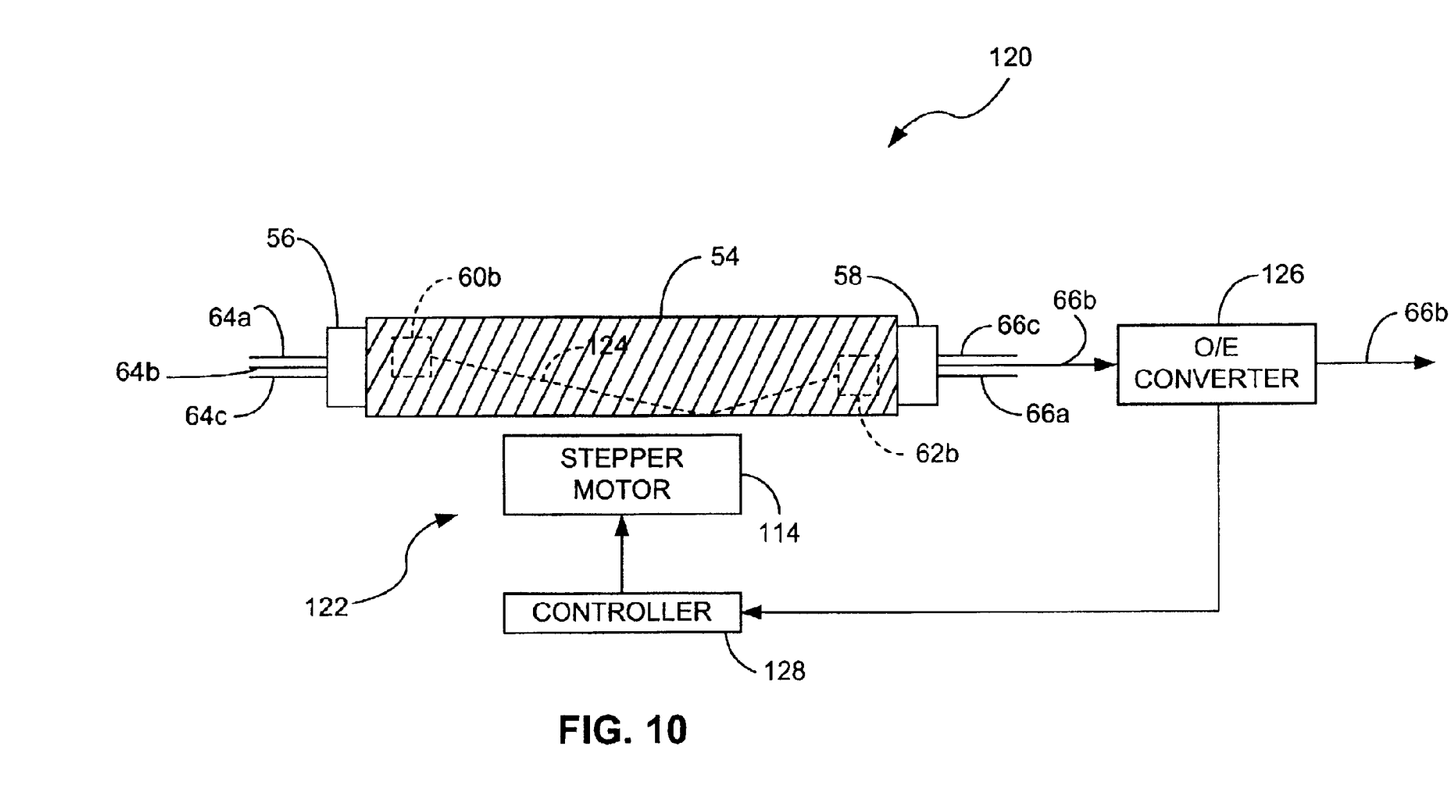
FIG. 10 is schematic block diagram of an electronic optical rotary coupler according to another embodiment of the invention.

FIG. 10 is a schematic block diagram of an electronic optical rotary coupler 120 according to an embodiment of the invention, where like numbers reference common components with respect to the coupler 100 of FIG. 9. The coupler 120 is similar to the coupler 100 except that an alignment circuit 122 uses electronic feed back to monitor the rotation of the connector 56 and to control the rotation of the prism 52 (FIG. 6). Consequently, the circuit 120 can often provide a more precise optical alignment between the terminals 60 and 62 (FIG. 6) than the alignment circuit 102.

The coupler 120 uses the terminals 60*b* and 62*b* as alignment terminals that are optically aligned with one another when the other terminals 60 are optically aligned with their respective corresponding terminals 62. An alignment light beam 124 propagates from the fiber 64*b*, through the terminal 60*b*, the prism 52 (FIG. 6), and the terminal 62*b*, to the fiber 66*b*. Except for carrying the alignment beam 124, the terminals 60*b* and 62*b* and the fibers 64*b* and 66*b* are typically the same as the other terminals 60 and 62 and fibers 64 and 66.

In addition to the stepper motor 114, the alignment circuit 122 includes an optical-to-electrical converter 126 and a controller circuit 128. The converter 126 receives the alignment beam 124 from the fiber 66*b* and converts it into an electric signal having a value that is proportional to the amplitude of the received beam. The amplitude of the received beam 124 is inversely proportional to the error in the optical alignment between the terminals 60*b* and 62*b*; consequently, these terminals, and thus all of the other terminals 60 and 62, are optimally aligned when the amplitude of the received beam 124, and thus the value of the electronic signal, are at a maximum. Therefore, the circuit 128 causes the motor 114 to rotate the prism 52 (FIG. 6) as necessary to maintain the value of the electronic signal at a maximum. In one embodiment, the alignment beam 124 propagates beyond the converter 126 to allow alignment of other couplers 120 (not shown). In another embodiment, a separate alignment beam is provided for each coupler 120.

In operation, according to an embodiment of the invention, when the coupler 120 is activated, the controller circuit 128 causes the stepper motor 114 to rotate the prism 52 (FIG. 6) into its home position with respect to the connector 58. Specifically, the circuit 128 causes the motor 114 to rotate the prism back and forth systematically with an amplitude that is too small to disrupt the signal flow through any of the aligned beams. This technique is often called "dithering". The amplitude and phase of the resulting modulation of any or all of the beams is used to derive an error signal that drives the motor 114 to dither the prism rotation symmetrically about the point of maximum alignment. This allows the motor 114 to both track the rotation of the movable cable member and to maintain optimum optical alignment of the coupler under all conditions. To reduce the noise on the electronic signal, a transmitter (not shown) coupled to the fiber 64*b* can modulate the light beam 124 with a sine wave, and the converter 126 or the circuit 128 can filter the sinusoidal electronic signal through a narrow pass band to remove the frequencies outside of this band.

Figure 11:
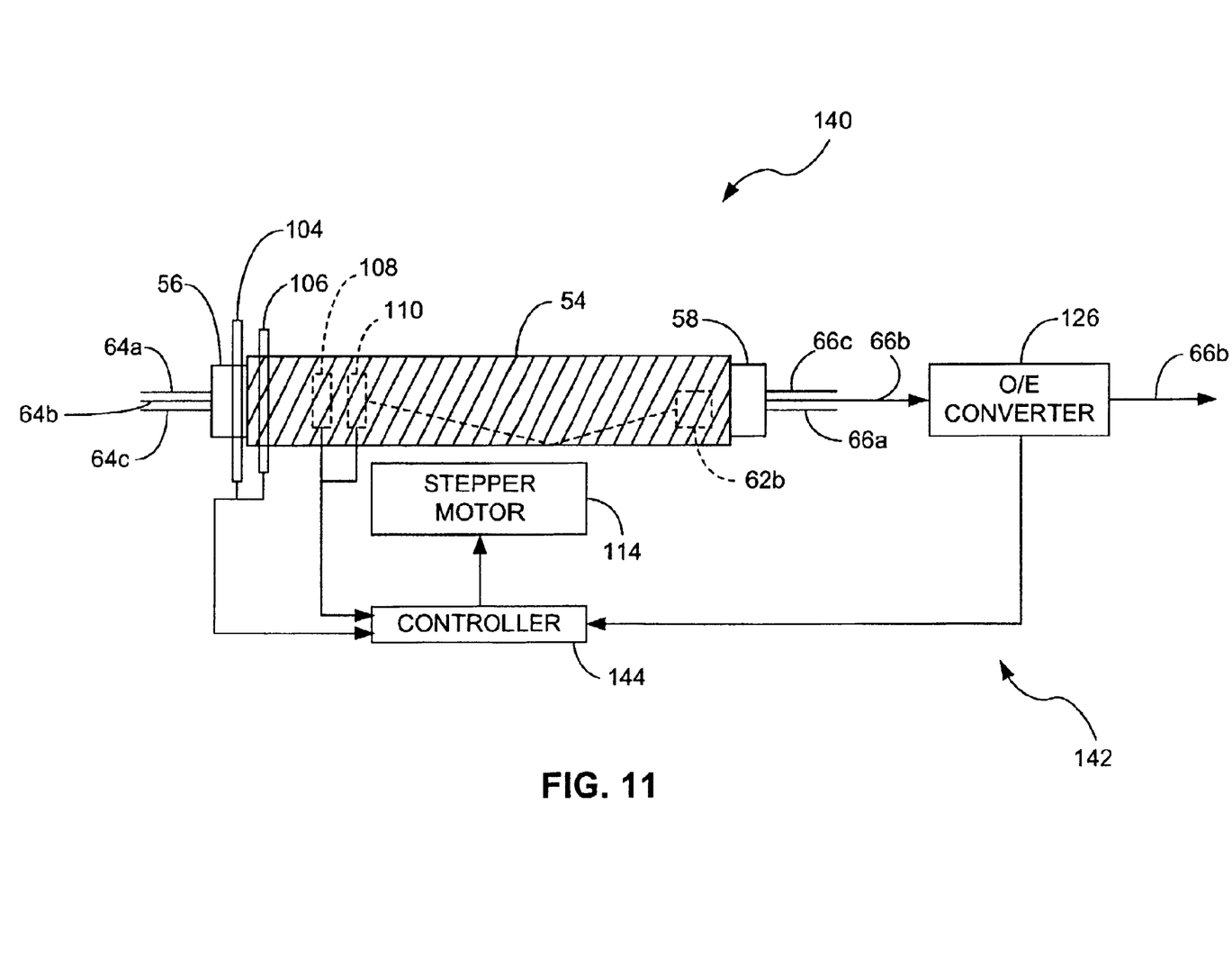
FIG. 11 is schematic block diagram of an electronic optical rotary coupler according to another embodiment of the invention.

FIG. 11 is a schematic block diagram of an electronic optical rotary coupler 140 according to an embodiment of the invention, where like numbers reference common components with respect to the couplers 100 and 120 of FIGS. 9 and 10. The coupler 140 includes an alignment circuit 142, which is a combination of the alignment circuits 102 and 122 of FIGS. 9 and 10, respectively. Specifically, the circuit 142 operates like the alignment circuit 102 for coarse optical alignment of the terminals 60 and 62 and operates like the circuit 122 for fine alignment of these terminals.

In operation, according to an embodiment of the invention, a controller circuit 144 causes the stepper motor 114 to rotate until the sensors 108 and 110 indicate that the prism 52 (FIG. 6) is in its home position with respect to the connector 58. Next, the circuit 112 processes the angle data from the sensors 104 and 106 and determines the angular distance θ that the connector 56 is from its home position. Then, if the connector 56 is not in its home position, the circuit 112 determines the angle −½θ that it must rotate the prism 52 to bring the terminals 60 and 62 (FIG. 6) back into coarse optical alignment, and causes the motor 114 to rotate the prism through this calculated angle in a manner similar to that discussed above in conjunction with FIG. 9. Next, to finely align the terminals 60 and 62, the circuit 144 causes the motor 114 to dither the prism 52 to the position in which the signal from the converter 126 has a maximum value. The circuit 144 continues to monitor the sensors 104 and 106 and repeats these coarse and fine alignment procedures as needed to maintain optical alignment between the terminals 60 and 62 in response to further rotation of the connector 56. And even when the sensors 104 and 106 do not indicate such further rotation, the circuit 144 may maintain fine alignment by repeating the fine-alignment procedure whenever the value of the signal from the converter 126 falls below its last-established maximum.

Figure 12:
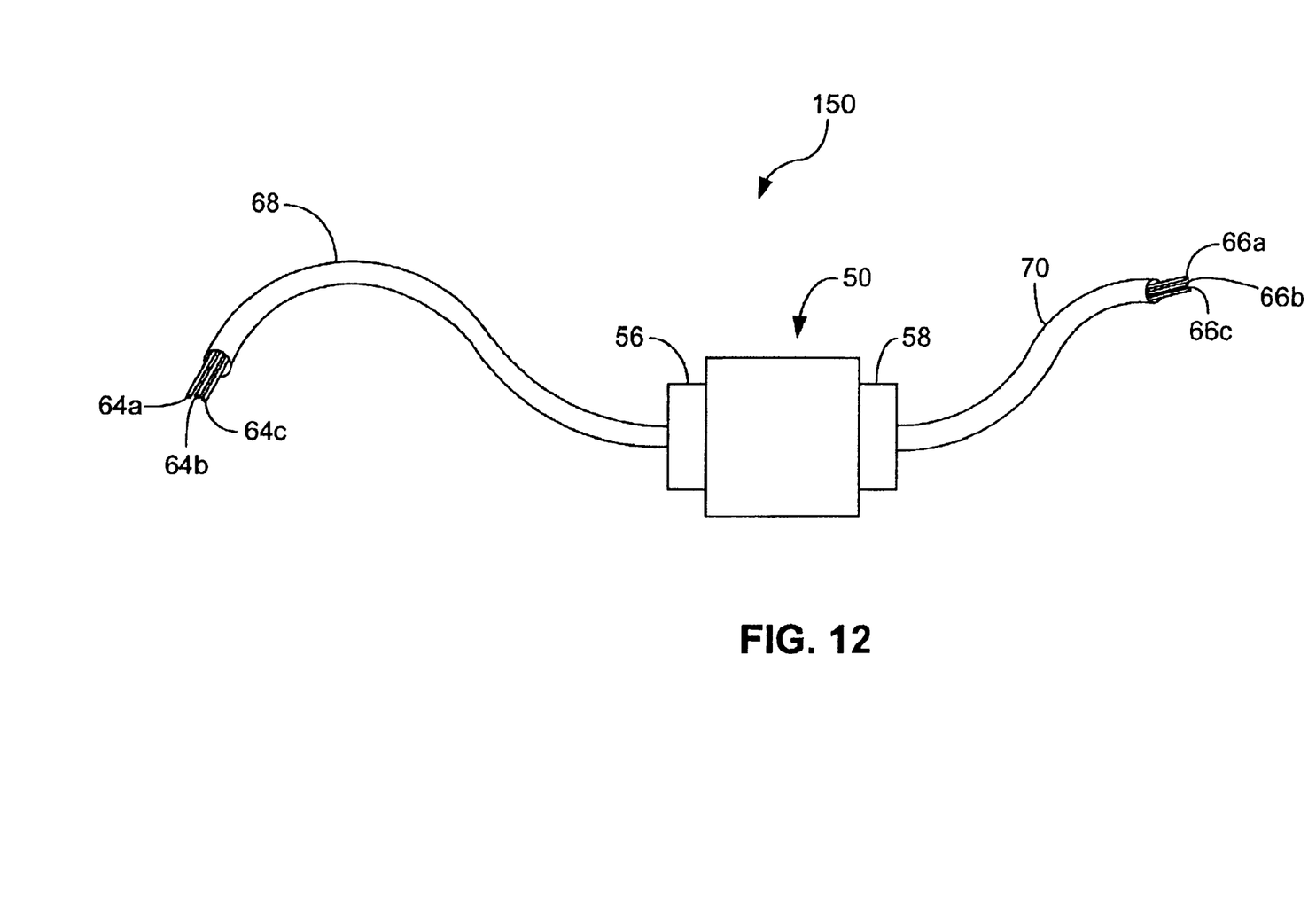
FIG. 12 is a cable that incorporates one or more of the optical rotary couplers of FIG. 6 and FIGS. 9–11 according to an embodiment of the invention.

FIG. 12 is a view of a cable 150 that incorporates one or more of the optical rotary couplers 50, 100, 120, and 140 of FIGS. 6, 8, 10, and 11, respectively. For example purposes, the system 150 is shown incorporating the coupler 50, it being understood that a similar discussion also applies if the system 150 incorporates one or more of the other couplers 100, 120, and 140.

In addition to the coupler 50, the cable 150 includes the cable segments 68 and 70, which the coupler 50 interconnects. Each cable segment includes the optical fibers 64 and 66, and each corresponding pair of fibers carries the same optical signal. For example, corresponding fibers 64a and 66a carry the same signal, as do corresponding fibers 64b and 66b, etc.

In operation, as the cable segments 68 and 70 twist with respect to one another, the coupler 50 maintains optical alignment between the corresponding optical fibers 64 and 66 in the manner discussed above in conjunction with FIG. 6.

Figure 13:
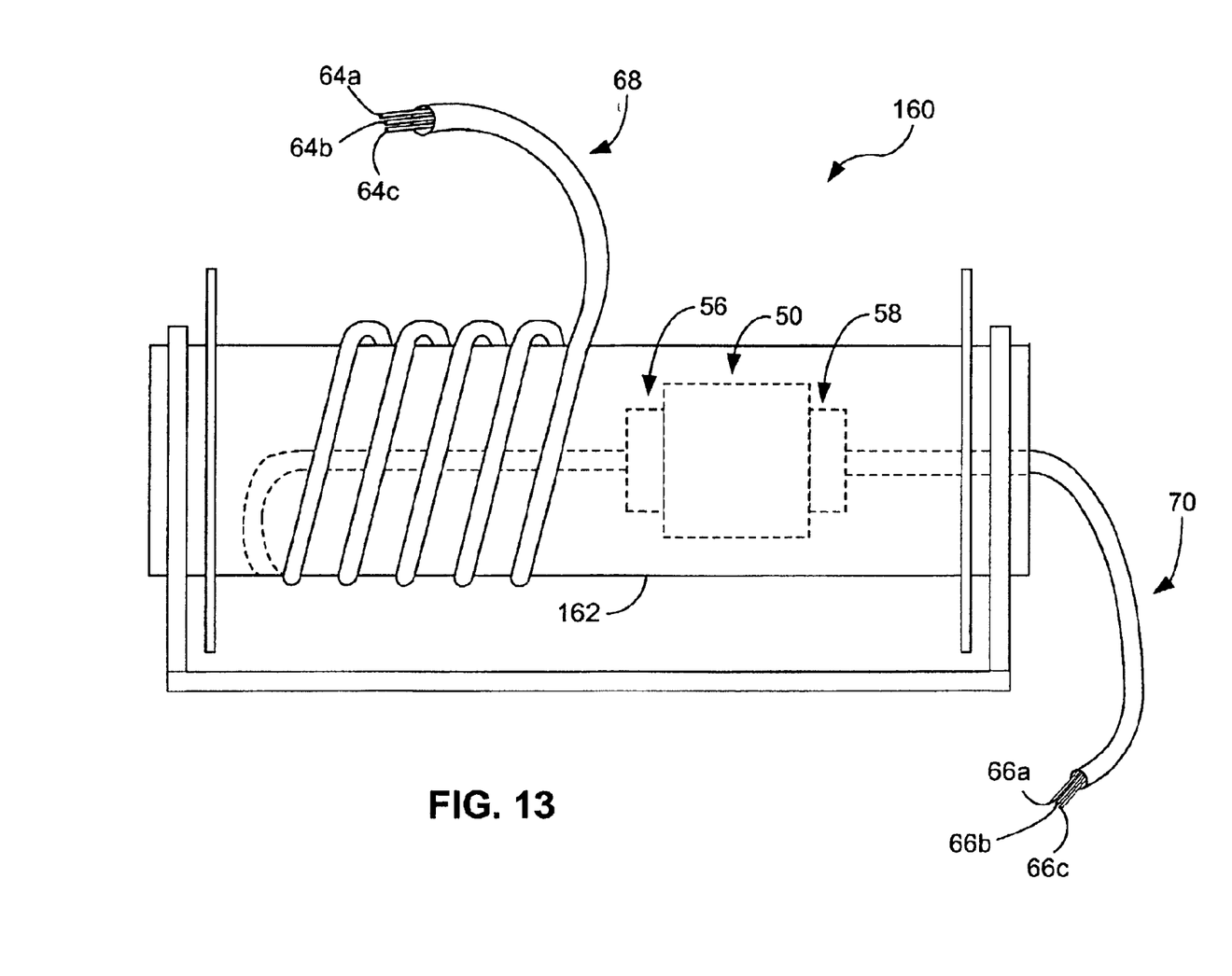
FIG. 13 is a drum assembly that can store the cable of FIG. 12 in a deployable tether configuration according to an embodiment of the invention.

FIG. 13 is a view of a drum assembly 160, which can store the cable 150 of FIG. 12 in a deployable tether configuration according to an embodiment of the invention. Specifically, the cable 150 is wound about a rotatable drum 162 of the drum assembly 160. To let out the cable 150, the assembly 160 rotates the drum 162 so as to unwind the cable 150. Conversely, to reel in the cable 150, the assembly 160 rotates the drum 162 in the opposite direction. For example, where the cable 150 is the umbilical cord between a surface vessel and a submersible (neither shown), the assembly 160 is mounted to the vessel and typically includes a motor (not shown) that rotates the drum 162 to unwind the cable when the submersible is being used and to reel in the cable when the submersible is brought back in. And to prevent excess slack in the cable 150 while the submersible is being used, the assembly 160 may also include a control circuit (not shown) that causes the motor to maintain a desired amount of tension in the cable 150 as the submersible moves with respect to the vessel. Although the cable 150 is shown as having one optical rotary coupler 50 that interconnects two cable segments 68 and 70, the cable may include additional cable segments that are interconnected by additional optical rotary couplers.

What is claimed is:

1. An optical coupler, comprising:
   a housing;
   a first optical terminal disposed in the housing;
   a second optical terminal disposed in the housing, the second terminal moveable with respect to the first terminal;
   a prism disposed in the housing and moveable to cause an optical alignment between the first and second terminals;
   a motor operable to move the prism; and
   an alignment circuit and optical alignment sensors operable with optical-electrical feed back between the prism and the motor to maintain the optical alignment.

2. The optical coupler of claim 1 wherein the housing is cylindrically shaped.

3. The optical coupler of claim 1 wherein the first and second optical terminals respectively comprise first and second beam collimators.

4. The optical coupler of claim 1 wherein the first and second optical terminals respective comprise first and second lenses.

5. The optical coupler of claim 1 wherein the prism comprises a dove prism.

6. The optical coupler of claim 1 wherein the prism is disposed between the first and second optical terminals.

7. The optical coupler of claim 1 wherein:
   the second optical terminal is rotatable with respect to the first optical terminal; and
   the prism is operable to rotate in response to rotation of the second optical terminal to maintain the optical alignment between the first and second optical terminals.

8. The optical coupler of claim 1 wherein:
   the second optical terminal is rotatable with respect to the first optical terminal; and
   the prism is operable to rotate half the angular distance and in the opposite direction as the second optical terminal to maintain the optical alignment between the—first and second optical terminals.

9. The optical coupler of claim 1 wherein:
   the second optical terminal is rotatable with respect to the first optical terminal; and
   the prism is operable to rotate at half the angular speed and in the opposite direction as the second optical terminal to maintain the optical alignment between the first and second optical terminals.

10. The optical coupler of claim 1 wherein the alignment circuit comprises coarse alignment means and fine alignment means.

11. The optical coupler of claim 1 wherein the alignment circuit comprises means for dithering the motor and prism.

12. An optical coupler, comprising:
    a cylindrical housing having an interior and first and second ends;
    a first connector disposed at the first end of the housing;
    a first optical terminal mounted to the first connector;
    a second rotatable connector disposed at the second end of the housing;
    a second optical terminal mounted to the second connector; and
    a rotatable dove prism disposed in the interior of the housing and operable to optically align the first and second optical terminals; and
    an alignment circuit operable to,
       detect a rotation angle $\theta$ of the second connector with respect to the first connector; and
       rotate the dove prism an angle $-\frac{1}{2}\theta$ with respect to the first connector to maintain the optical alignment between the first and second optical terminals.

13. The optical coupler of claim 12 wherein:
    the first connector is unrotatable with respect to the housing; and
    the second connector and the dove prism are rotatable with respect to the housing.

14. The optical coupler of claim 12 wherein the first and second optical terminals respectively comprise first and second GRIN lenses.

15. The optical coupler of claim 12 wherein the first and second optical terminals are each operable to receive a respective optical fiber.

16. The optical coupler of claim 12, further comprising a liquid fill disposed within the interior of the housing, the prism rotating within the liquid fill.

17. The optical coupler of claim 16, further comprising first and second seals disposed in the housing and operable to seal the interior of the housing from an environment external to the housing.

18. The optical coupler of claim 10, further comprising:
    third and fourth optical terminals respectively mounted to the first and second connectors, the third optical terminal operable to transmit an optical alignment signal to the fourth optical terminal; and
    wherein the alignment circuit is operable to receive the alignment signal from the fourth optical terminal, the received alignment signal having an amplitude, and to maintain the optical alignment between the first and second optical terminals by rotating the dove prism so as to maintain the amplitude of the received alignment signal at a maximum level.

19. The optical coupler of claim 12 wherein the alignment circuit comprises coarse and fine alignment circuitry.

20. The optical coupler of claim 12 wherein the fine alignment circuitry comprises means for dithering the motor and prism.

21. An optical coupler, comprising:
a cylindrical housing having an interior and first and second ends;
a first connector disposed at the first end of the housing;
a first plurality of optical terminals mounted to the first connector;
a second rotatable connector disposed at the second end of the housing;
a second plurality of optical terminals mounted to the second connector;
a rotatable dove prism disposed in the interior of the housing; and
an electronic controlled motor operable to rotate the dove prism to maintain optical alignment between each of the first plurality of optical terminals and respective ones of the second plurality of optical terminals.

22. An optical coupler, comprising:
first and second optical terminals;
a housing to which at least one of the first and second optical terminals is mounted for relative rotation;
an alignment prism mounted to the housing and rotatable relative thereto to form an optical path for propagation of light between the first and second terminals; and
an alignment control operable in response to propagation of light in the optical path to rotate the alignment prism to maintain optical alignment of the optical path with the first and second terminals.

23. An optical coupler, comprising:
first and second optical terminals;
a housing to which at least one of the first and second optical terminals is mounted for relative rotation;
an alignment prism mounted to the housing and rotatable relative thereto to form an optical path between the first and second terminals; and
an optical-to-electrical alignment control responsive to an alignment light beam in the optical path to rotate the alignment prism to maintain optical alignment of the optical path with the first and second terminals.

24. The optical coupler of claim 23 wherein the optical-to-electrical alignment control comprises:
an optical-to-electrical sensor producing an electrical signal in response to the alignment light beam in the optical path; and
an alignment control motor responsive to the electrical signal to rotate the alignment prism to maintain the optical alignment of the optical path.

25. An optical coupler, comprising:
first and second optical terminals;
a housing to which at least one of the first and second optical terminals is mounted for relative movement;
an alignment prism mounted to the housing and moveable relative thereto to form an optical path between the first and second terminals;
a sensor producing a signal in response to light propagating in the optical path;
a motor for moving the alignment prism; and
an alignment feed back control responsive to the signal to move the alignment prism to maintain optical alignment between the optical path and the first and second terminals.

* * * * *